United States Patent
Chkodrov et al.

(10) Patent No.: US 12,379,958 B2
(45) Date of Patent: Aug. 5, 2025

(54) PROTOCOL EXCEPTION HANDLING EXTERNAL TO DETERMINISTIC CODE

(71) Applicant: Microsoft Technology Licensing, LLC, Redmond, WA (US)

(72) Inventors: Gueorgui Bonov Chkodrov, Redmond, WA (US); Dan Alexandru Nicolescu, Bellevue, WA (US); Khoi Hong, Seattle, WA (US); Anitta Maria Miller, Bellevue, WA (US); Jose Wilson Morris, Bothell, WA (US); Juan Miguel Paredes, Redmond, WA (US); Justin Matthew Powell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 605 days.

(21) Appl. No.: 17/585,368

(22) Filed: Jan. 26, 2022

(65) Prior Publication Data
US 2023/0236875 A1 Jul. 27, 2023

(51) Int. Cl.
G06F 9/46 (2006.01)
G06F 9/48 (2006.01)

(52) U.S. Cl.
CPC ...... G06F 9/4843 (2013.01); *G06F 2209/481* (2013.01)

(58) Field of Classification Search
USPC .......................................................... 718/102
See application file for complete search history.

(56) References Cited

U.S. PATENT DOCUMENTS 10,789,195 B1 * 9/2020 Jha .......................... G06F 13/42
10,831,595 B1 * 11/2020 Cassidy .............. G06F 11/1608
(Continued)

FOREIGN PATENT DOCUMENTS

CN      112202724 A  *  1/2021   .......... G06F 9/5027
WO      2020060639 A1    3/2020

OTHER PUBLICATIONS

"International Search Report and Written Opinion issued in PCT Application No. PCT/US2022/053299", Mailed Date: Mar. 28, 2023, 12 Pages.
(Continued)

*Primary Examiner* — April Y Blair
*Assistant Examiner* — Ross Michael Vincent
(74) *Attorney, Agent, or Firm* — Workman Nydegger (57) ABSTRACT

The handling of protocol exceptions for deterministic code that communicates with external component(s). A protocol exception host updates an execution state object associated with the deterministic code as the execution of the deterministic code proceeds. The component also detects whether a protocol exception has occurred that was caused by the deterministic code communicating using the protocol with an external component. If the component detects that such a protocol exception has occurred, the component handles the protocol exception. The component also determines whether the handled protocol exception has been successfully handled. If the exception is not successfully handled, the component stops the execution of the deterministic code such that the execution state object includes execution state of the deterministic code up to the stop. Accordingly, the execution state of the deterministic code up to the stop may be later used to resume execution of the deterministic code.

20 Claims, 6 Drawing Sheets

(56) References Cited

U.S. PATENT DOCUMENTS

| | | | |
|---|---|---|---|
| 10,977,166 B1* | 4/2021 | Jaganmohan | G06N 5/02 |
| 2005/0177759 A1* | 8/2005 | Cabrera | G06F 11/1441 |
| | | | 714/2 |
| 2013/0347064 A1* | 12/2013 | Aissi | G06F 21/53 |
| | | | 726/2 |
| 2016/0094654 A1* | 3/2016 | Raman | G06F 3/04842 |
| | | | 715/733 |
| 2019/0243730 A1 | 8/2019 | Iyengar et al. | |
| 2020/0074422 A1 | 3/2020 | Hearn et al. | |
| 2022/0222106 A1* | 7/2022 | Mallavarapu | G06F 9/485 |

OTHER PUBLICATIONS

Gailey, et al., "Handling Errors in Durable Functions (Azure Functions)", Retrieved from: https://docs.microsoft.com/en-us/azure/azure-functions/durable/durable-functions-error-handling?tabs=csharp, Dec. 29, 2021, 7 Pages.

Gillum, et al., "What are Durable Functions?", Retrieved from: https://docs.microsoft.com/en-us/azure/azure-functions/durable/durable-functions-overview?tabs=python, Nov. 9, 2021, 19 Pages.

\* cited by examiner

PROTOCOL EXCEPTION HANDLING EXTERNAL TO DETERMINISTIC CODE

BACKGROUND

It is advantageous to monitor events that happen within a system. An example of such a system is a datacenter. A typical datacenter has a dedicated security operations center in which security analysts monitor for potential hacking activity that might be occurring within the datacenter. Another example of a system is a development environment system. In such a system, a developer/operations ("devops") center may include analysts that monitor for events that occur within a larger software development environment.

Rules may be used to generate events based on activity happening within a system. Those events may then be presented to an analyst. However, the event itself may not contain enough information for the analyst to be able to identify the nature or seriousness of the event. To find out more about the event, the analyst may manually query (i.e., perform lookups) for raw data from the system, such as from a datastore and/or a log. Then, using information from these lookups, the nature of the event may be understood, and an appropriate response can be taken within the system.

When a particular type of event is frequently encountered, the analyst may perform the same types of lookups whenever that type of event is encountered. Thus, to avoid frequent manual repetition, the analyst can implement code that invokes the lookups automatically. Later, such code may even be automatically executed upon encountering such an event type, so that when the event is surfaced to the analyst, the corresponding queried information may also be presented. Such rich information is even used to automatically take action responsive to the event.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the handling of protocol exceptions for deterministic code that communicates with one or more external components. As an example, the deterministic code may be script that automatically queries a datastore for information related to a particular type of event. The deterministic code may be executed in the context of a protocol exception host that handles one or more protocol-based exceptions. Accordingly, the author of the deterministic code need not author the code in a way that the protocol-based exception(s) are handled. Thus, the deterministic code may be more easily authored, focusing more on the ideal execution, rather than worry about exceptions.

The protocol exception host updates an execution state object associated with the deterministic code as the execution of the deterministic code proceeds. For instance, as a data is successfully retrieved from successful communications with one or more external components, the successful retrieved data is included within the execution state object.

The protocol exception host also detects whether a protocol exception has occurred that was caused by the deterministic code communicating using the protocol with an external component. If the component detects that such a protocol exception has occurred, the protocol exception host handles the protocol exception. The protocol exception host also determines whether the handled protocol exception has been successfully handled. If the protocol exception host determines that the exception was not successfully handled, the protocol exception host stops the execution of the deterministic code such that the execution state object includes execution state of the deterministic code up to the stop. Accordingly, the execution state of the deterministic code up to the stop may be later used to restart execution of the deterministic code without having to perform the data retrieval again for prior successful retrievals. Thus, using the execution state, the exception handling host retries from the last successful operation.

This is advantageous as redoing the external calls invoked from the deterministic code may waste processing resources, particularly within the external component to which the call is made. Furthermore, if the deterministic code includes operations (such as external queries) that have a higher likelihood of failing, then restarting the deterministic code may result in many restarts since subsequent executions may also encounter failures. Finally, re-executing all of the deterministic code from the start may result in some operations being performed multiple times, even for operations that should only be done once (such as sending an e-mail). Redoing prior successful external queries from the beginning may be avoided since the previously successfully performed external queries are not re-executed. Instead, upon a subsequent execution of the deterministic code, the execution state from the prior execution is used to allow the execution of the deterministic code to resume where the prior execution left off. And since the code is deterministic, the resuming execution is possible without changing the outcome of the execution.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the handling of protocol exceptions for deterministic code that communicates with one or more external components. As an example, the deterministic code may be script that automatically queries a datastore for information related to a particular event. The deterministic code is "deterministic" in the sense that the outcome of the execution does not depend on how many times or when the deterministic code is executed. After all, the objective of the deterministic code is to obtain more information about an event that has occurred. The nature of the event is defined at the time the event occurred, and does not depend on the passage of time after the event occurred. Thus, those that craft code to find out more information about an event will draft the code to be deterministic.

The deterministic code may be executed in the context of a protocol exception host that handles one or more protocol-based exceptions. Accordingly, the author of the deterministic code need not author the code in a way that the protocol-based exception(s) are handled. Thus, the deterministic code may be more easily authored, focusing more on the ideal execution, rather than worry about protocol-based exceptions involved with communicating with an external component. Often, those that want more information about an event are analysts of that event, and are not necessarily experienced in coding. Thus, allowing the deterministic code to be authored without (or with less) protocol-based exception handling allows for those with less experience in coding to directly author the deterministic code, without waiting for a more experienced coder to author code in accordance with an analyst's specifications. However, the principles described herein allow for easier authoring of code even if the coder is experienced in coding.

The protocol exception host updates an execution state object associated with the deterministic code as the execution of the deterministic code proceeds. For instance, as a data is successfully retrieved from successful communications with one or more external components, the successful retrieved data is included within the execution state object. The protocol exception host also detects whether a protocol exception has occurred that was caused by the deterministic code communicating using the protocol with an external component. If the protocol exception host detects that such a protocol exception has occurred, the protocol exception host handles the protocol exception. The protocol exception host also determines whether the handled protocol exception has been successfully handled. If the protocol exception host determines that the exception was not successfully handled, the protocol exception host stops the execution of the deterministic code such that the execution state object includes execution state of the deterministic code up to the stop. Accordingly, the execution state of the deterministic code up to the stop may be later used to restart execution of the deterministic code without having to perform the data retrieval again for prior successful retrievals. Thus, using the execution state, the exception handling host retries from the last successful operation.

This is advantageous as redoing the external calls invoked from the deterministic code may waste processing resources, particularly within the external component to which the call is made. Furthermore, if the deterministic code includes operations (such as external queries) that have a higher likelihood of failing, then restarting the deterministic code may result in many restarts since subsequent executions may also encounter failures. Finally, re-executing all of the deterministic code from the start may result in some operations being performed multiple times, even for operations that should only be done once. Redoing prior successful external queries from the beginning may be avoided since the previously successfully executed performed external queries are not re-executed. Instead, upon a subsequent execution of the deterministic code, the execution state from the prior execution is used to allow the execution of the deterministic code to resume where the prior execution left off. And since the code is deterministic, the resuming execution is possible without changing the outcome of the execution.

Figure 1:
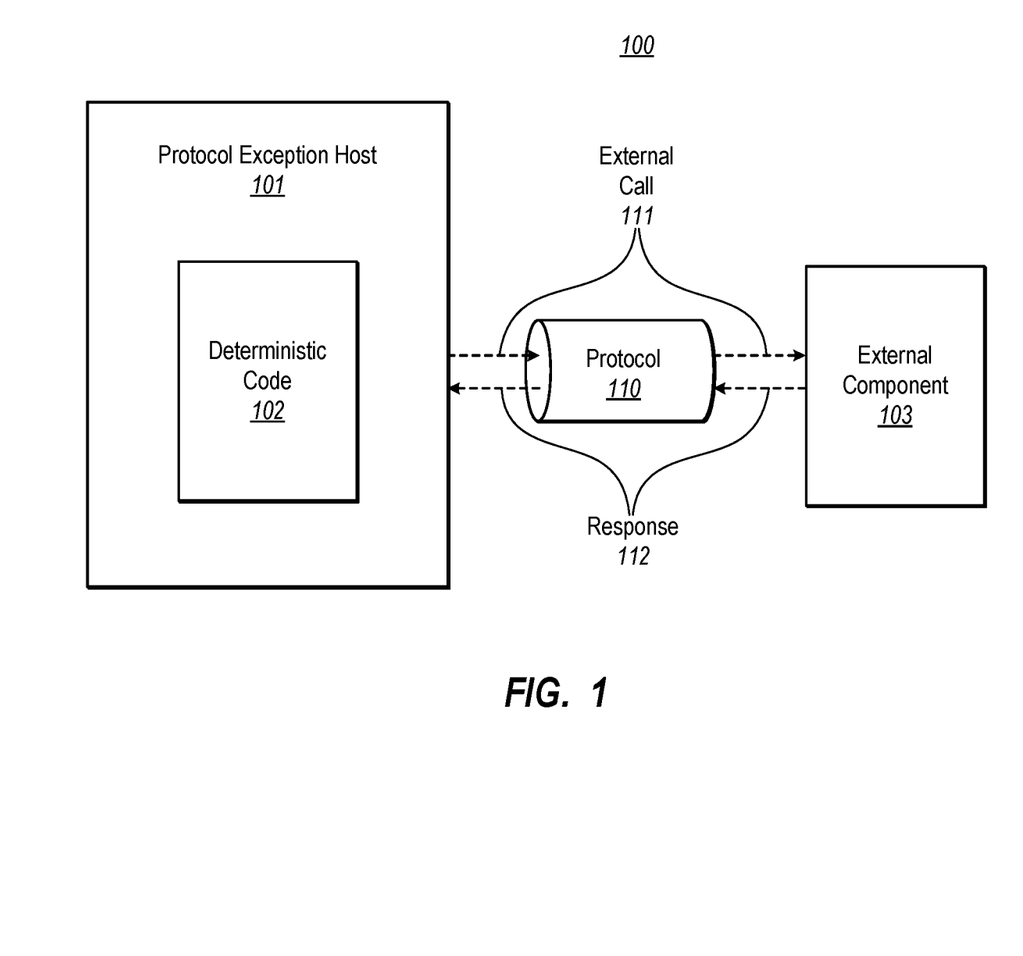
FIG. 1 illustrates an environment in which the principles described herein may operate, which includes a protocol exception host that hosts deterministic code, interacts with an external component, and updates execution state as execution of the deterministic code proceeds.

FIG. 1 illustrates an environment 100 in which the principles described herein may operate. The environment 100 includes a protocol exception host 101 that hosts deterministic code 102. The protocol exception host 101 manages execution of the deterministic code 102 such that when the deterministic code 102 makes an external call to an external component using a protocol, that external call is made by the protocol exception host 101.

As an example, the protocol exception host 101 may make an external call 111 to an external component 103 using a protocol 110. The protocol 101 may be for example, the Representational State Transfer (REST) protocol. The deterministic code 102 is "deterministic" in that the result of the execution would be the same for each complete execution of the deterministic code 102. In accordance with the protocol 101, a response 112 is ideally (but not always) returned.

The protocol exception host 101 also manages state of execution of the deterministic code 102 such that if execution of the deterministic code 102 is stopped, the state of execution managed by the protocol exception host 101 may be used to resume execution of the deterministic code 102. This is done by simply restarting execution of the deterministic code 102. If there is no state of execution of the deterministic code 102, then the execution of the deterministic code 102 proceeds to the end. However, if there is state of execution of the deterministic code being managed by the protocol exception host 101, that state of execution may be used to simply retry from the last successful operation.

Figure 2:
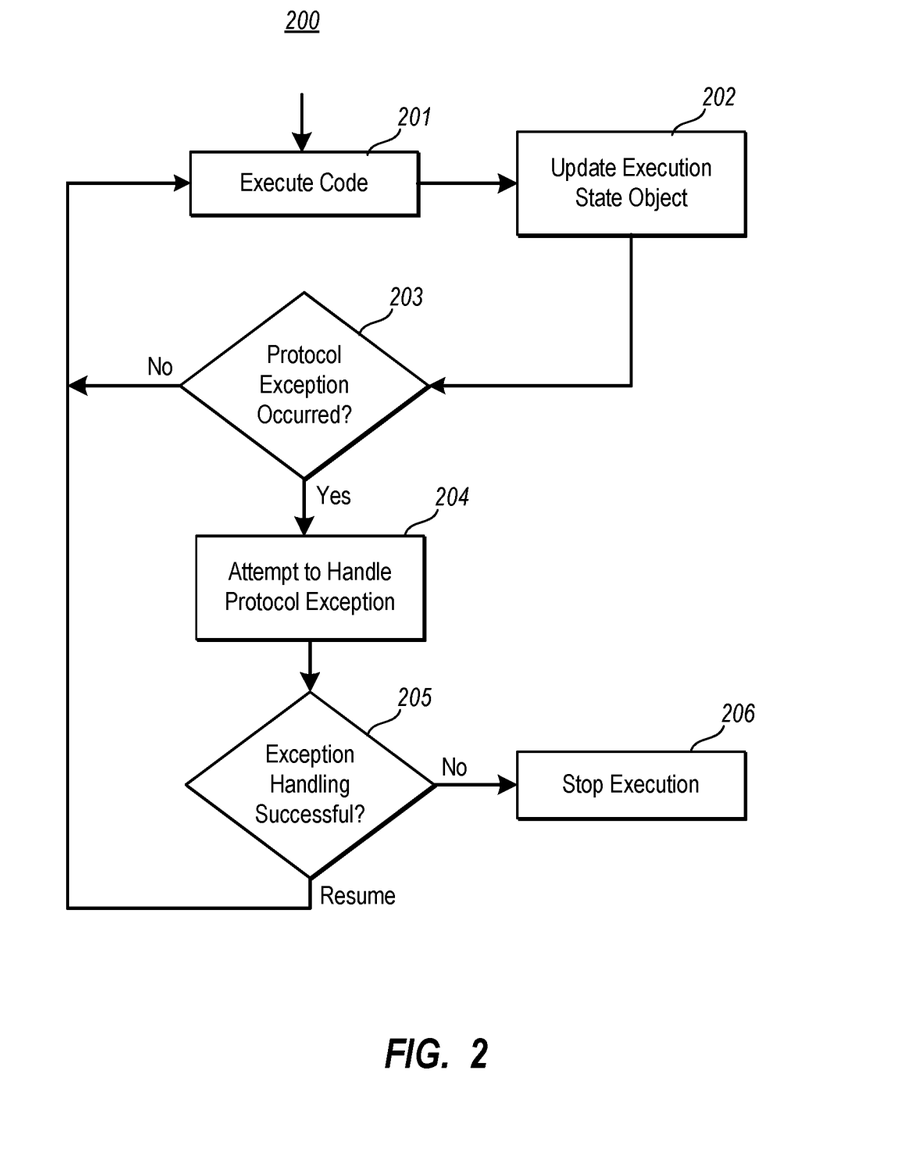
FIG. 2 illustrates a flowchart of a method for handling protocol exceptions external to deterministic code, in accordance with the principles described herein.

FIG. 2 illustrates a flowchart of a method 200 for handling protocol exceptions external to deterministic code, in accordance with the principles described herein. The method 200 of FIG. 2 may be performed by the protocol exception host 101 of FIG. 1. Accordingly, the operation of the protocol exception host 101 of FIG. 1 will hereinafter be described with frequent reference to the method 200 of FIG. 2.

In particular, the protocol exception host 101 may be structured as described below for the computer-executable component 706 of the computing system 700 of FIG. 7. That is, the protocol exception host 101 may be instantiated, operated, and/or configured to operate as described herein by the one or more processors 702 executing one or more computer-executable instructions stored on the computer-readable media 704, the computer-executable instructions structured to cause such instantiation, operation and/or configuration to occur.

The protocol exception host performs the method 200 for deterministic code that uses a protocol to communicate with one or more external components. As an example, referring to FIG. 1, the protocol exception host 101 performs the method 200 for deterministic code 102 that uses the protocol 110 to communicate with the external component 103.

In the method 200, the protocol exception host executes the deterministic code (act 201). In the example environment 100 of FIG. 1, the protocol exception host 101 causes the deterministic code 102 to be executed. As the execution of the deterministic code proceeds (act 201), the protocol exception host 101 updates an execution state object associated with the deterministic code (act 202). The execution of the deterministic code (act 201) and the updating of the execution state object (act 202) are performed such that the execution state object reflects the current execution state of the deterministic code. Thus, act 201 and act 202 are shown in a loop. If there are no protocol exceptions that are encountered associated with the deterministic code communicating with an external component using the protocol ("No" in decision block 203), the communication is successfully completed allowing execution to continue. This loop continues until such a protocol exception is encountered ("Yes" in decision block 203), or until the execution is completed, at which point the execution state object can be discarded.

If a protocol exception has occurred caused by execution of the deterministic code communicating with an external component (e.g., during a lookup), then the protocol exception host detects that a protocol exception has occurred ("Yes" in decision block 203), and the protocol exception host attempts to handle the protocol exception (act 204). In some embodiments, the protocol exception is a recoverable protocol exception without human intervention. If so, the handling of the protocol exception (act 204) comprises handling the protocol exception without prompting a user for corrective action. An example of a recoverable protocol exception is a failure due to transient network issues. On the other hand, if the protocol exception is a non-recoverable protocol exception that is not recoverable absent human intervention, the handling of the protocol exception (act 204) comprising prompting a user for corrective action, and thereafter confirming that the corrective action has occurred. An example of a non-recoverable protocol except is a failure to authenticate to the external component due to invalid credentials. In that case, user intervention is needed to provide correct credentials.

If the exception is not successfully handled ("No" in decision block 205), the protocol exception host stops the execution of the deterministic code (act 206) and remembers to try the execution again later, such that the execution state object includes execution state of the deterministic code up to the stop. Thus, the execution state within the execution state object represents the execution state up to the stop. That execution state can later be used when resuming execution of the deterministic code.

Figure 3:
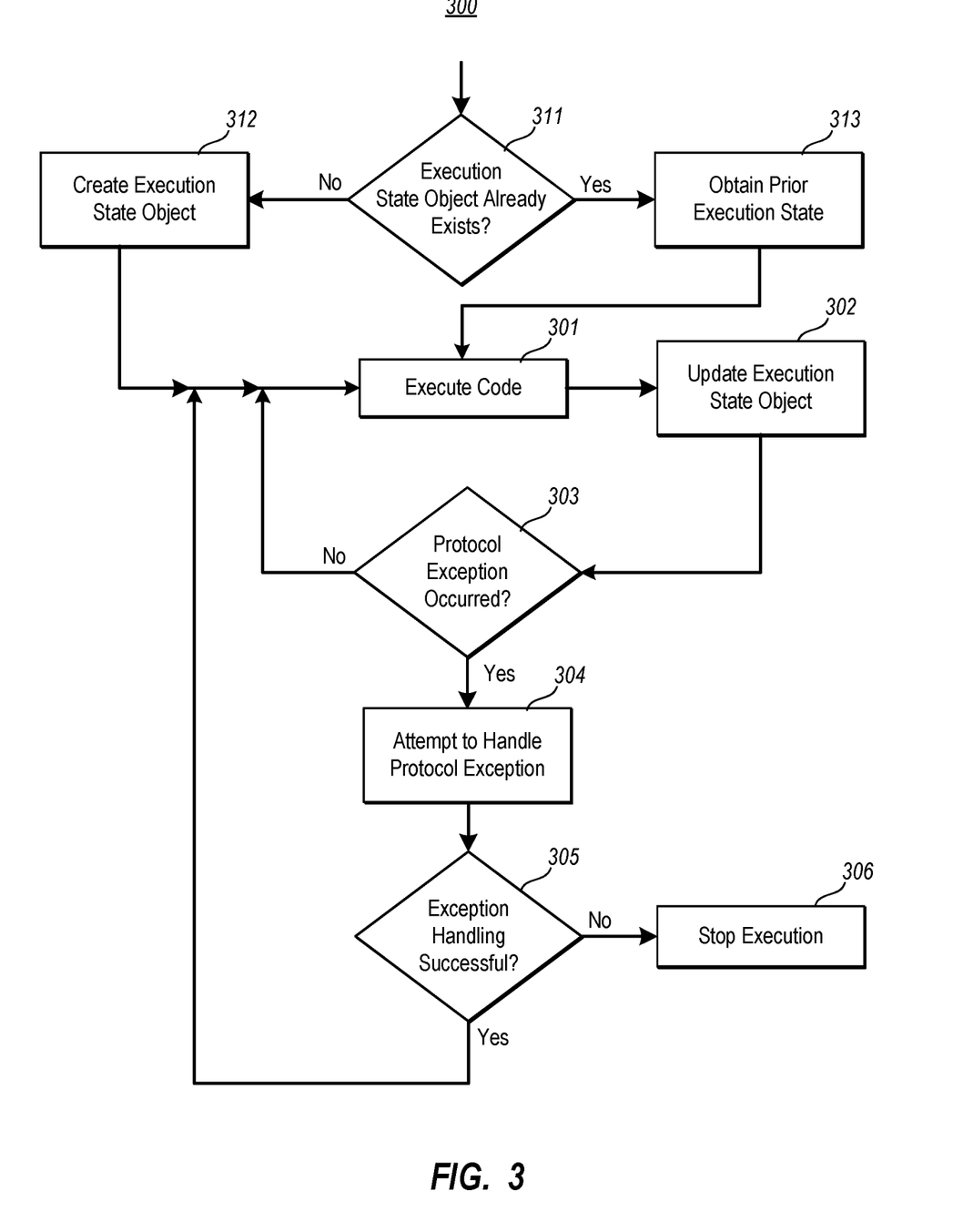
FIG. 3 illustrates a flowchart of a method for handling protocol exceptions external to deterministic code, which is similar to the embodiment of FIG. 2, except that the execution state is initially checked to determine if this is the first execution of the deterministic code, or a resumption of execution from a prior unsuccessful execution of the deterministic code.

FIG. 3 illustrates a flowchart of a method 300 handling protocol exceptions external to deterministic code, in accordance with the principles described herein. Acts 301 through 306 of the method 300 may be the same as described above for the acts 201 through 206, respectively, of FIG. 2. However, in the case of the method 300 of FIG. 3, prior to executing the deterministic code (act 301), acts 311 through 313 are performed.

Specifically, the protocol exception host determines whether an execution state object associated with the deterministic code already exists (decision block 311). If such execution state does not already exist ("No" in decision block 311), the protocol exception host creates the execution state object associated with the deterministic code (act 312). In this case, the execution of the deterministic code comprises beginning execution of the deterministic code. On the other hand, if the execution state object associated with the deterministic code already exists ("Yes" in decision block 311), then the prior execution state for the deterministic code is obtained (act 313). In this case, the execution state represents a resume state to be assumed when executing the deterministic code. Accordingly, the execution of the deterministic code (act 301) in that case comprises resuming execution of the deterministic code.

The embodiment described above is advantageous as redoing execution of the deterministic code may waste processing resources. Furthermore, if the deterministic code includes operations (such as external queries) that have a higher likelihood of failing, then restarting the deterministic code may result in many restarts since subsequent executions may also encounter failures. Finally, re-executing the deterministic code from the start may result in some operations being performed multiple times, even for operations that should only be done once (such as sending an e-mail). Such restarting from the beginning may be avoided since the previously successfully executed portion of the deterministic code is not re-executed. Instead, upon a subsequent execution of the deterministic code, the execution state from the prior execution is used to allow the execution of the deterministic code to resume where the prior execution left off. And since the code is deterministic, the resuming of execution is possible without changing the outcome of the execution. Furthermore, if the deterministic code was in the middle of outgoing call to an external component (such as a datacenter), but then the datacenter went dark, the outcome of the external call is unknown as the result is missed. The principles described herein permit recovery from the previous state just as if there was a transient exception.

Figure 4:
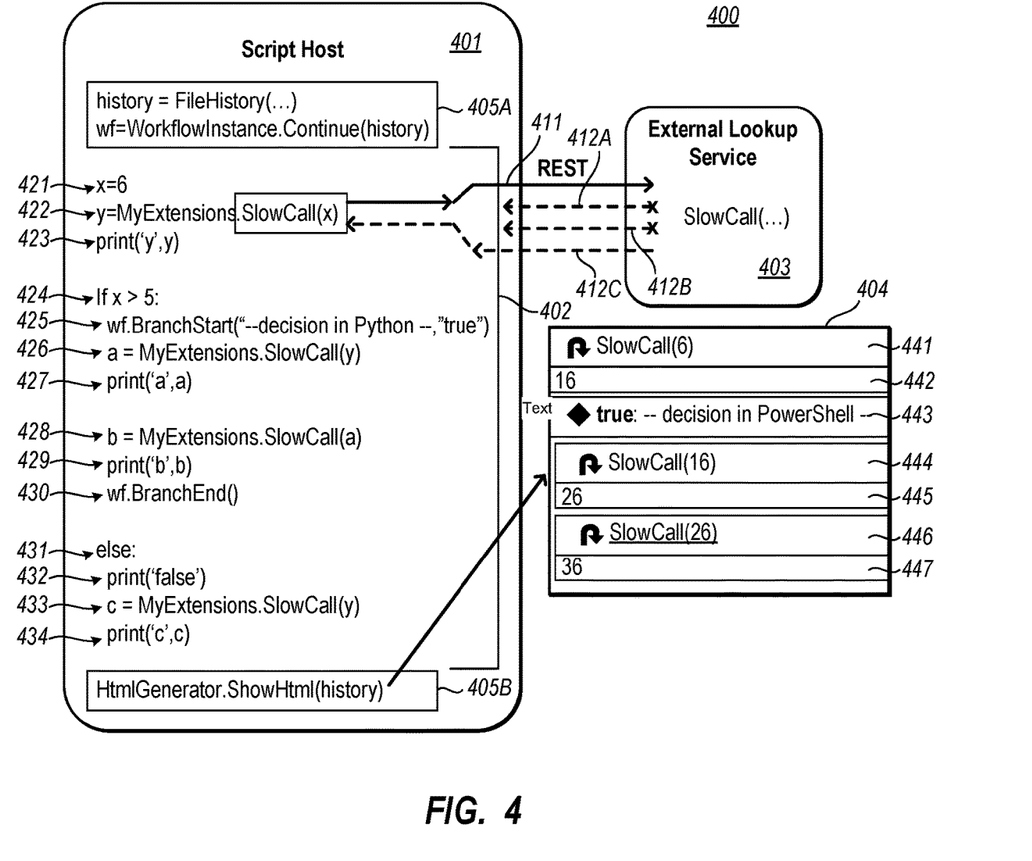
FIG. 4 illustrates an example operation of a script host in executing deterministic code while communicating with the external lookup service and updating history as appropriate.

FIG. 4 illustrates an example operation 400 of a script host 401 in executing deterministic code 402. In the execution of the deterministic code 402, the script host 401 communicates with the external lookup service 403. The script host 401 of FIG. 4 is an example of the protocol exception host 101 of FIG. 1. The deterministic code 402 of FIG. 4 is an example of the deterministic code 102 of FIG. 1. The external lookup service 403 of FIG. 4 is an example of the external component 103 of FIG. 1.

In this particular example, the deterministic code 402 is written in Python, though the principles described herein are not limited to the deterministic code being written in any particular language. For easy reference, the lines of the deterministic code 402 are labelled 421 through 434. The deterministic code 402 has functions called "SlowCall" (at lines 422, 426, 428, 433), which are merely to illustrate places in the deterministic code where calls may be made to an external lookup service. These calls are at higher risk of experiencing a protocol exception since they result in communication over a protocol with an external component. For instance, when executing line 422, the script host 401 communicates (as represented by arrow 411) to the external lookup service 403, and ultimately receives 412C (after two prior failures 412A and 412B) a resulting value, which is then stored as the value of variable "y". Since the variable "x" is set at value 6 in line 421, execution will proceed through lines 421 through 430. Lines 431 through 434 will not be executed since the value of variable "x" is not greater than 5 (as tested in the if statement of line 424).

The deterministic code 402 is illustrated as performing simple integer operations. That is, the external component 403 in this simple example simply adds 10 to an input integer variable value to generate an output integer value. Thus, in this simple example, "x" is 6, so "y" should be 16, and so "a" should be 26, and so "b" should be 36. Useful scripts will use variables such as email addresses, cloud service subscription GUIDs, nested structures in JSON, and so forth. But, to make the example simpler, we used trivial integer operations.

The deterministic code 402 is executed by the script host 401, before and after running the deterministic code 402. The code 405A and 405B is code run by the script host 401 and is not included within the deterministic code 402. The code 405A is run prior to executing the deterministic code 402. The code 405B is run after executing the deterministic code 402. The code 405A operates to create a history object if one has not already been created (see act 312 of FIG. 3) and continues from a prior saved history if one has been created (see act 313 of FIG. 3). As an example, the continue function in the second line of code 405A operates to continue execution from the immediate prior unsuccessful execution of that deterministic code (if there had been such a prior unsuccessful execution).

When SlowCall is invoked in line 422 of the deterministic code, the script host 401 responds by placing an external call 411 to the external lookup service 403. However, the first attempt at this call failed (as represented by failed response 412A). Thus, a protocol exception occurred (see "Yes" in decision block 303), and the script host attempted to handle the exception (see act 304 of FIG. 3). This attempt results in two further retry calls to the external lookup service 403, which ultimately results in a successful response 412C. Thus, the exception handling performed by the script host was ultimately successful (see "Yes" in decision block 305), allowing execution of the deterministic code 402 to proceed past line 422. This is even though the deterministic code 402 has no mechanism for handling such a protocol-based exception.

The script history data structure 404 is populated as execution proceeds to reflect the execution state of the deterministic code 402. Specifically, when SlowCall in line 422 is invoked, entry 441 is created to reflect to invocation of SlowCall. When SlowCall succeeds, a success indicator (as symbolized by the u-shaped arrow) is associated with the entry 441. Furthermore, the entry 442 is recorded to reflect the value (in this case 16) returned by the invocation of SlowCall in line 422. When if statement 424 is encountered, and evaluated as true, the entry 443 is created. When SlowCall in line 425 is invoked, entry 444 is created to reflect to second invocation of SlowCall. When SlowCall succeeds, a success indicator is associated with the entry 444, and the entry 445 is recorded to reflect the value (in this case 26) returned by the second invocation of SlowCall.

When SlowCall in line 428 is invoked, entry 446 is created to reflect a third invocation of SlowCall. When SlowCall succeeds, a success indicator is associated with the entry 446, and the entry 447 is recorded to reflect the value (in this case 36) returned by the third invocation of SlowCall.

If at any point, the invocation of SlowCall were to fail even after attempts by the script host to handle the exception (e.g., see "No" in decision block 305 of FIG. 3), an indication of such a failure would instead have been recorded at the appropriate entry in the history 404. Code 405B generates a human-readable form of the history. However, the key for later resuming of the execution is that the total execution state of the prior execution of the deterministic code may be obtained up to the point of the failure, without reattempting previously successful SlowCall invocations. Instead, the values returned in those prior successful SlowCall invocations may be used. This is an advantage when using history that contains one or more values obtained from one or more external calls placed by the deterministic code, and an identification of a point in execution at which successful execution completed.

Figure 5:
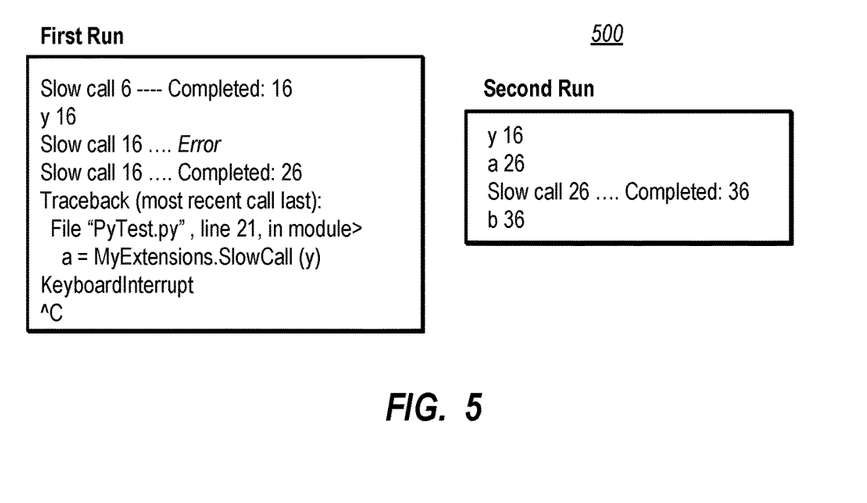
FIG. 5 illustrates a console output resulting from two manual executions of the deterministic code of FIG. 4 in the context of the script host of FIG. 4.

As an example, FIG. 5 illustrates a console output resulting from two manual executions of the deterministic code 402 in the context of the script host 401. The left is the console output of the first run, which for illustrative purposes was forced to end by a keyboard interrupt. In the first run, the first invocation of SlowCall successfully returned a value of 16, and line 422 assigned the value of 16 to variable y. This was printed by line 423 into the console as "y 16". In the first run, the second invocation of SlowCall (while having one failure that was successfully handled by the script host) was also successfully returned as value 26. We know from the output of the second run that this value of 26 was successfully assigned to the variable "a" although line 427 did not execute in the first run.

The second run on the right does not repeat the first invocation of SlowCall. Instead, when line 423 executes "y 16" is printed. The second run on the right also does not repeat the second invocation of "SlowCall". Instead, when line 427 executes, "a 16" is printed. The third invocation of SlowCall (at line 428) was never performed in the first run. Thus, the second run does perform this third invocation of SlowCall (at line 428), this invocation was successful and returned a value of 36. This value was assigned to variable b. Thus, the final console output line of the second run indicates "b 36" resulting from the execution of line 429.

The protocol exception host may be configured to execute the deterministic code in response to the occurrence of an event. Thus, the protocol exception host may be configured to execute the deterministic code at an appropriate time. As an example, the event may include the detection of a user instruction to execute the deterministic code. Accordingly, an analyst may author deterministic code having in mind a particular event that the analyst is analyzing. Then, immediately when the deterministic code is complete, the analyst may cause the deterministic code to execute thereby automatically obtaining additional information about the event. Also, the user may cause the deterministic code to execute on a console, thereby allowing the user to view how the deterministic code performs.

The event may alternatively be performed automatically upon the detection of a particular kind of event. In this case, there is no need for a user instruction. Instead, the deterministic code immediately executes and presents to the analyst not only the event, but all of the relevant related information concerning that event. As an example, the event may comprise detecting a security alert, with the deterministic code comprising one or more external calls to a datastore to obtain information concerning the security alert. In this case, the security alert may be associated with activity in a datacenter, and the datastore being a datastore may contain data associated with activity in the datacenter. Alternatively, the event may comprise detection of a software development alert. Here, the deterministic code comprises one or more external calls to a datastore to obtain information concerning the software development alert.

In the description, variable "history" is used to represent one instance of the code execution. Storing the history is a point of extensibility and can be implemented in various ways. As an example, the variable may be stored on the file system, to allow light-weight local testing. As another example, the variable may be stored on a relational database, thus achieving transactional integrity. As a final example, the variable may be stored on cloud storage.

Figure 6:
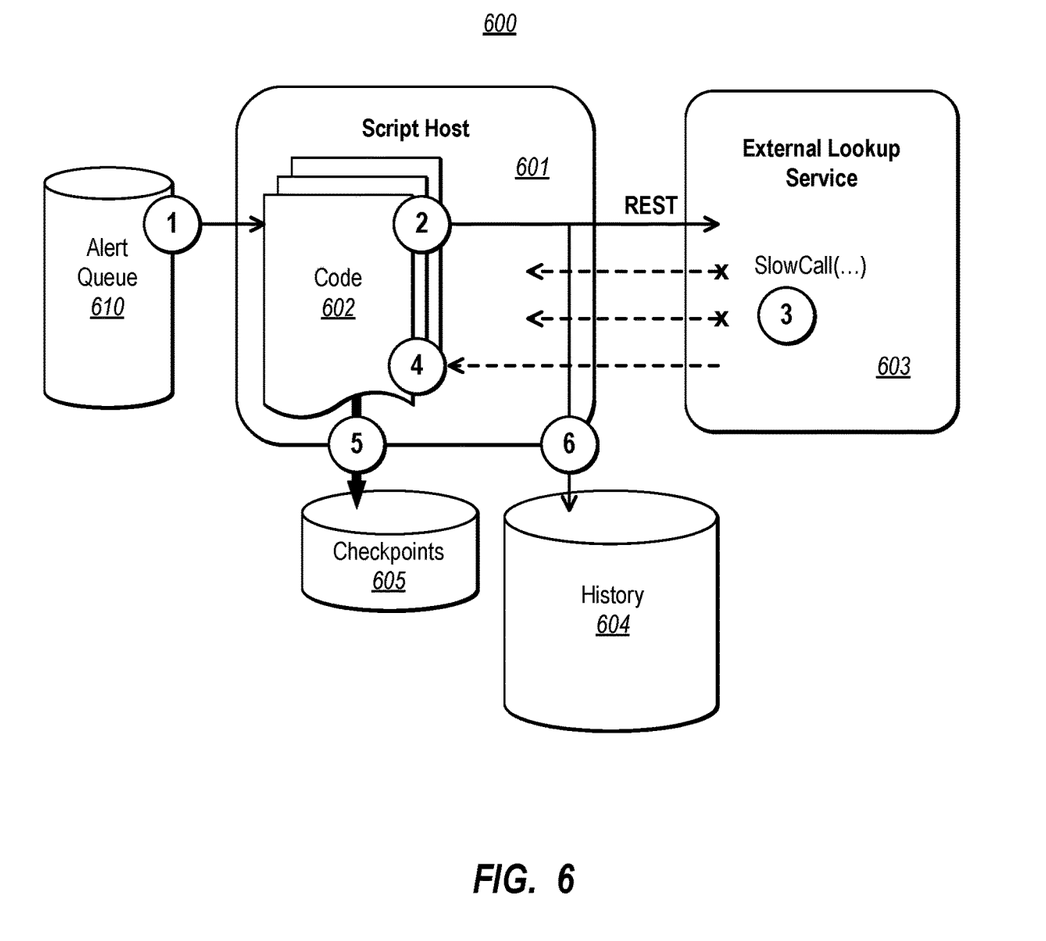
FIG. 6 illustrates an environment in which a script host processes alerts from an alert queue.

FIG. 6 illustrates an environment in which a script host 601 processes alerts from an alert queue 610. The script host here hosts different deterministic code 602, each corresponding to a particular type of alert. Here, upon encountering a new alert from the queue 610, the script host 601 determines which deterministic code 602 to execute, executes that deterministic code, and makes appropriate calls to the external lookup service 603. The script host 601 checkpoints 605 the state of execution of the deterministic code periodically. In addition, the script host creates history 604 for each execution of each deterministic code.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
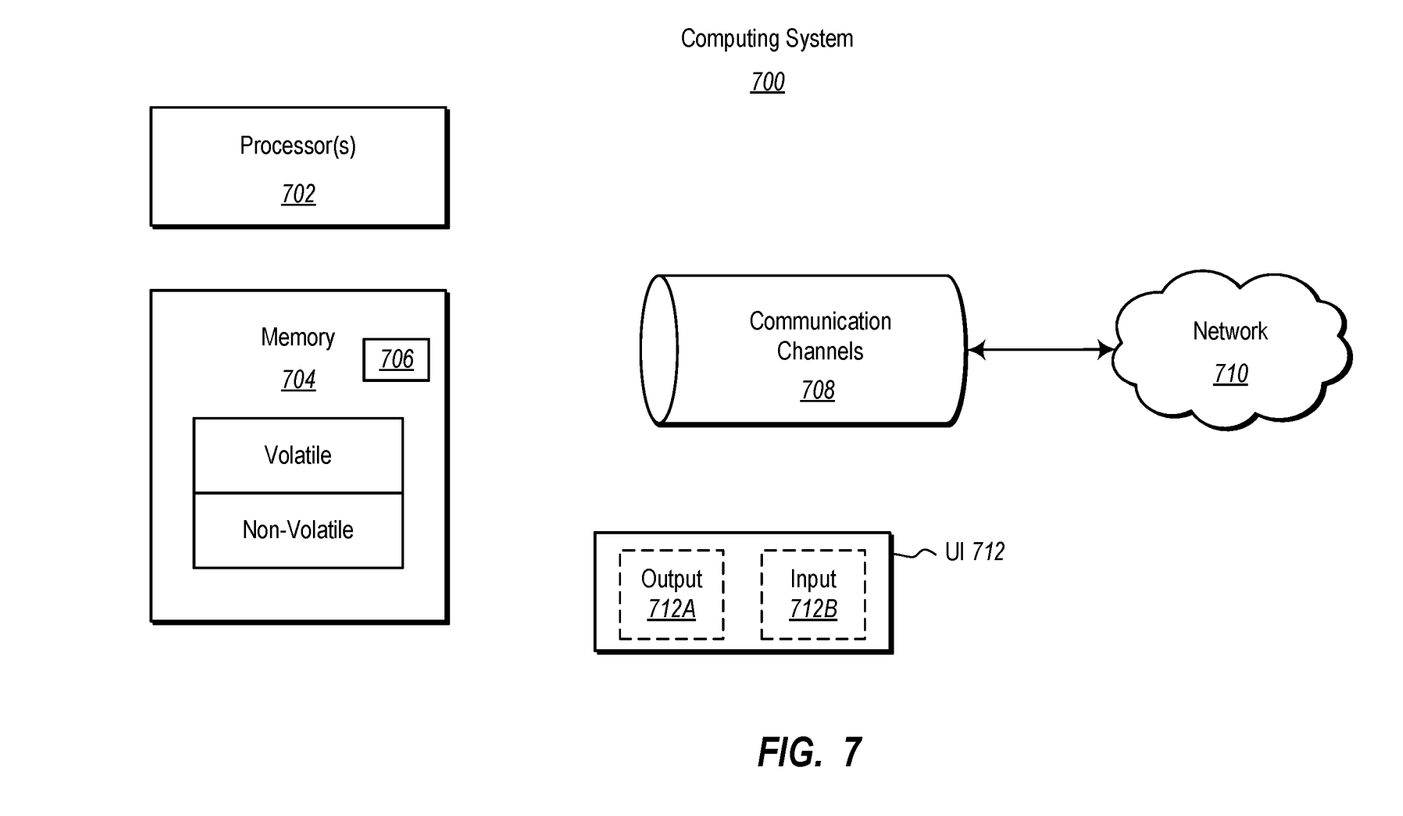
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and one or more computer-readable media having thereon computer-executable instructions that are executable by the one or more processors to cause the computing system to:

prior to execution of deterministic code, identify presence or absence of a prior execution state object associated with the deterministic code;

in response to identifying the presence of the prior execution state object associated with the deterministic code, resume execution of the deterministic code from a resume state that the prior execution state object represents and update the prior execution state object to be a current execution state object;

in response to identifying the absence of the prior execution state object associated with the deterministic code, create the current execution state object, wherein creation of the current execution state object triggers execution of the deterministic code;

update the current execution state object associated with the deterministic code as the execution of the deterministic code proceeds;

detect a protocol exception, wherein the protocol exception is determined to have been caused by the deterministic code communicating using a protocol with an external component, and wherein the protocol exception is one that is included in a group of protocol exceptions comprising: a recoverable protocol exception occurring due to a transient network issue and a non-recoverable protocol exception occurring due to failure to authenticate stemming from attempted use of an invalid credential;

attempt to handle the protocol exception; and in response to determining that the protocol exception has not been successfully handled, stop the execution of the deterministic code such that the current execution state object includes execution state of the deterministic code up to the stop, and such that the execution state of the deterministic code up to the stop is reusable to later retry execution of the deterministic code, wherein:

the current execution state object comprises data retrieved from the external component, and an outcome from the execution of the deterministic code does not depend on an identified number of times or when the deterministic code is executed.

2. The computing system in accordance with claim 1, wherein the execution state of the deterministic code comprises one or more values obtained from one or more external calls placed by the deterministic code.

3. The computing system in accordance with claim 1, wherein the execution state of the deterministic code comprises an identification of a point in execution at which successful execution completed.

4. The computing system in accordance with claim 1, wherein the instructions are further executable to cause the computing system to detect occurrence of an event.

5. The computing system in accordance with claim 4, wherein the event comprises detection of a user instruction to execute the deterministic code.

6. The computing system in accordance with claim 4, wherein the event comprises detecting a security alert, and the deterministic code comprises one or more external calls to a datastore to obtain information concerning the security alert.

7. The computing system in accordance with claim 6, wherein the security alert is associated with activity in a datacenter, the datastore being a datastore containing data associated with activity in the datacenter.

8. The computing system in accordance with claim 4, wherein the event comprises detecting an alert, and the deterministic code comprises one or more external calls to a datastore to obtain information concerning the alert.

9. The computing system in accordance with claim 1, wherein the group of protocol exceptions further includes an unsuccessful communication with the external component.

10. The computing system of claim 1, wherein the protocol exception is one that occurs externally relative to the deterministic code.

11. The computing system of claim 1, wherein the protocol exception occurs as a part of a lookup operation involving the deterministic code and the external component.

12. The computing system of claim 1, wherein the attempt to handle the protocol exception includes re-executing the deterministic code at least twice.

13. The computing system of claim 1, wherein resuming the execution of the deterministic code from the resume state includes executing the deterministic code without reattempting previously successful invocations and instead reusing specific values included in the resume state, the specific values corresponding to the previously successful invocations.

14. The computing system of claim 1, wherein the deterministic code is executed in response to detection of a security alert.

15. The computing system of claim 1, wherein the instructions are further executable to cause the computing system to:

store an alert in an alert queue;

determine a type for the alert in the alert queue; and select the deterministic code for execution, wherein the deterministic code is selected based on a decision that the deterministic code corresponds to the determined type for the alert in the alert queue.

16. The computing system of claim 1, wherein a history is created for each execution of the deterministic code.

17. A computer-implemented method for handling protocol exceptions external to deterministic code, the computer-implemented method comprising:

prior to execution of the deterministic code, identifying presence or absence of a prior execution state object associated with the deterministic code;

in response to identifying the presence of the prior execution state object associated with the deterministic code, resuming execution of the deterministic code from a resume state that the prior execution state object represents and updating the prior execution state object to be a current execution state object;

in response to identifying the absence of the prior execution state object associated with the deterministic code, creating the current execution state object, wherein creation of the current execution state object triggers execution of the deterministic code;

updating the current execution state object associated with the deterministic code as the execution of the deterministic code proceeds;

detecting a protocol exception, wherein the protocol exception is determined to have been caused by the deterministic code communicating using a protocol with an external component, and wherein the protocol exception is one that is included in a group of protocol exceptions comprising: a recoverable protocol exception occurring due to a transient network issue and a non-recoverable protocol exception occurring due to failure to authenticate stemming from attempted use of an invalid credential;

attempting to handle the protocol exception; and in response to determining that the protocol exception has not been successfully handled, stopping the execution of the deterministic code such that the execution state object includes execution state of the deterministic code up to the stop, and such that the execution state of the deterministic code up to the stop is reusable to later retry execution of the deterministic code, wherein:
- the current execution state object comprises data retrieved from the external component, and
- an outcome from the execution of the deterministic code does not depend on an identified number of times or when the deterministic code is executed.

18. The computer-implemented method in accordance with claim 17, wherein the deterministic code comprises script.

19. The computer-implemented method in accordance with claim 17, wherein the execution state comprises one or more values obtained from one or more external calls placed by the deterministic code.

20. One or more hardware storage devices that store instructions that are executable by one or more processors to cause the one or more processors to:

prior to execution of deterministic code, identify presence or absence of a prior execution state object associated with the deterministic code;

in response to identifying the presence of the prior execution state object associated with the deterministic code, resume execution of the deterministic code from a resume state that the prior execution state object represents and update the prior execution state object to be a current execution state object;

in response to identifying the absence of the prior execution state object associated with the deterministic code, create the current execution state object, wherein creation of the current execution state object triggers execution of the deterministic code;

updating the current execution state object associated with the deterministic code as the execution of the deterministic code proceeds;

detecting a protocol exception, wherein the protocol exception is determined to have been has occurred caused by the deterministic code communicating using a protocol with an external component, wherein the protocol exception is one that is included in a group of protocol exceptions comprising: a recoverable protocol exception occurring due to a transient network issue and a non-recoverable protocol exception occurring due to failure to authenticate stemming from attempted use of an invalid credential;

attempting to handle the protocol exception; and in response to determining that the protocol exception has not been successfully handled, stopping the execution of the deterministic code such that the current execution state object includes execution state of the deterministic code up to the stop, and such that the execution state of the deterministic code up to the stop is reusable to later retry execution of the deterministic code, wherein:
- the current execution state object comprises data retrieved from the external component, and
- an outcome from execution of the deterministic code does not depend on an identified number of times or when the deterministic code is executed.

* * * * *